United States Patent
Blasi

(10) Patent No.: US 11,298,810 B2
(45) Date of Patent: Apr. 12, 2022

(54) SHAFT DRIVING TOOL

(71) Applicant: Robert A. Blasi, Pratt, KS (US)

(72) Inventor: Robert A. Blasi, Pratt, KS (US)

(73) Assignees: Robert A. Blasi, Pratt, KS (US);
Teresa K. Blasi, Pratt, KS (US)

(\*) Notice: Subject to any disclaimer, the term of this patent is extended or adjusted under 35 U.S.C. 154(b) by 58 days.

(21) Appl. No.: 17/002,544

(22) Filed: Aug. 25, 2020

(65) Prior Publication Data

US 2020/0384622 A1 Dec. 10, 2020

(51) Int. Cl.
*B25B 27/02* (2006.01)
*F16H 1/06* (2006.01)

(52) U.S. Cl.
CPC ............ *B25B 27/023* (2013.01); *F16H 1/06* (2013.01)

(58) Field of Classification Search
CPC . B25B 27/023; F16H 1/06; B23P 6/02; B23P 11/00; B23P 11/005; B23P 11/027; B23P 19/00; B23P 19/10; B23P 19/12
USPC .................. 29/258, 259, 244, 267, 260, 280
See application file for complete search history.

(56) References Cited

U.S. PATENT DOCUMENTS

| | | | |
|---|---|---|---|
| 1,387,895 A * | 8/1921 | McBride | B25B 31/005 29/238 |
| 1,581,057 A | 4/1926 | Hill | |
| 1,589,862 A | 6/1926 | Quint | |
| 1,629,003 A | 5/1927 | Schonfeld | |
| 2,052,534 A | 8/1936 | Quarles | |
| 2,473,200 A * | 6/1949 | Griffin | B25B 27/023 29/283 |
| 3,691,612 A | 9/1972 | Layne | |
| 5,159,743 A | 11/1992 | Somerville | |
| 6,223,410 B1 | 5/2001 | Sroka | |
| 6,609,283 B1 | 8/2003 | Somerville | |

(Continued)

FOREIGN PATENT DOCUMENTS

| | | |
|---|---|---|
| EP | 0663547 | 1/1998 |
| EP | 1245340 | 2/2002 |
| EP | 1713619 | 12/2009 |

OTHER PUBLICATIONS

"Gear Punch Knockout Kit", iToolco, itoolco.com, Jul. 14, 2017 https://web.archive.org/web/20170714170717/https://itoolco.com/product/gear-punch-knockout-set-half-inch-to-two-inch/.

(Continued)

*Primary Examiner* — Anne M Kozak
*Assistant Examiner* — Tyler James McFarland
(74) *Attorney, Agent, or Firm* — Kenneth H. Jack; Davis & Jack, L.L.C.

(57) ABSTRACT

A tool for driving a shaft within an apertured member, the tool incorporating a segmented sleeve having upper, lower, and medial segments, each segment having upper and lower ends, a hollow bore of the lower segment being helically threaded; a shaft biasing screw mounted within the lower segment's hollow bore, upper and lower joints, the upper joint connecting the upper end of the screw with the upper segment, and the lower joint connecting the medial segment with the lower segment; a first gear attached to the upper segment; a support frame attached to the medial segment; a second gear mounted rotatably upon the support frame, the second gear being positioned for rotating the first gear; a rotary power input stem fixedly attached to the second gear; and a clamp or hook arms adapted for positioning the apertured member beneath the screw's shaft biasing lower end.

6 Claims, 5 Drawing Sheets

(56) References Cited

U.S. PATENT DOCUMENTS

| | | |
|---|---|---|
| 6,637,089 B1 | 10/2003 | English |
| 6,823,574 B2 | 11/2004 | Swanson |
| 7,496,999 B2 | 3/2009 | Robarge |
| 7,658,368 B2 | 2/2010 | Laun |
| 8,490,522 B1 | 7/2013 | Bryan |
| 9,085,071 B2 | 7/2015 | Larouche |
| 9,782,821 B1 | 10/2017 | Gregory |
| 10,611,007 B2 | 4/2020 | Seamons |
| 2002/0010996 A1 | 1/2002 | Sarver |
| 2006/0075617 A1 | 4/2006 | Toosky et al. |
| 2010/0224034 A1 | 9/2010 | Fitzpatrick |
| 2014/0237787 A1 | 8/2014 | Saito |
| 2014/0345104 A1 | 11/2014 | Andrews et al. |

OTHER PUBLICATIONS

"Cordless Drill Nail Puller", Cordless Drill Nail Puller, cordlessdrillnailpuller.com, Jul. 6, 2010 https://web.archive.org/web/20100706223118/http://www.cordlessdrillnailpuller.com/.

"QX Series Cordless Torque Multiplier", ZoAir, zoair.com https://zoair.com/wp-content/uploads/2018/11/QXM-IRITS-1116-212-QX-Series-Torque-Multiplier.pdf.

* cited by examiner

SHAFT DRIVING TOOL

FIELD OF THE INVENTION

This invention relates to gear pulling and shaft driving apparatus which are adapted for engaging and grasping an apertured member such as a gear or an axle mount, and for axial driving against a shaft or axle fixed within such aperture, such apparatus performing the function of removing the axle or shaft from the aperture.

BACKGROUND OF THE INVENTION

Commonly constructed and configured jack screw actuated gear pullers and shaft driving tools are often mechanically cumbersome and are difficult to operate. Where such a tool must be operated within a tight locale offering a limited working space, the tool may be virtually impossible to operate. The instant inventive shaft driving tool solves or ameliorates such problems by providing a multiply segmented sleeve which incorporates a drive gear at an upper sleeve segment, which incorporates a rotatably supported drill actuated gear upon a medial sleeve segment, and which incorporates shaft engaging structures mounted upon a lower sleeve segment.

BRIEF SUMMARY OF THE INVENTION

The instant inventive tool is preferably configured and adapted for driving against and removing a shaft of the type which is typically received within and mounted within an apertured member. Exemplary apertured members include a toothed gear and an annular axle mounting shoulder or step of a rotating element such as a fan.

A first structural component of the instant inventive tool comprises a multiply segmented sleeve having an upper segment, a lower segment, and a medial segment, each sleeve segment having upper and lower ends, and having a hollow bore. The sleeve's upper segment may be positioned above the upper end of the sleeve's medial segment or, in a preferred embodiment, the upper sleeve segment is nestingly received within the upper end of the hollow bore of the medial segment. Also in the preferred embodiment, the lower segment of the sleeve is nestingly received within the lower end of the hollow bore of the medial section, such receipt forming a lower rotation stopping pin-and-socket joint component of the inventive tool. In the preferred embodiment, the annular wall of the hollow bore of the sleeve's lower segment is helically threaded, presenting female screw threads.

A further structural component of the instant inventive tool comprises a screw shaft which is helically threadedly mounted within the lower segment's helically threaded hollow bore. In the preferred embodiment, an extreme lower end of such screw component is adapted for impinging against or biasing against an exposed end surface of a shaft or axle which is to be driven and removed by the inventive tool.

A further structural component of the instant inventive tool comprises an upper joint which attaches or interconnects the upper end of the screw with the sleeve's upper segment. In the preferred embodiment, such joint comprises an upper non-circular pin-and-socket joint, wherein the pin component of such joint comprises a non-circular head of the screw shaft, and wherein the socket component of such joint comprises a matching or mating non-circular cylindrical void adapted for slidably receiving such head. Other differently configured joints which may similarly interconnect the upper end of the screw shaft and the upper sleeve segment are considered to fall within the scope of the invention.

A further structural component of the instant inventive tool comprises the lower joint which mounts the lower end of the sleeve's medial segment upon an upper end of the sleeve's lower segment. Similarly with the non-circular rotation resisting configuration of the upper joint, the sleeve's lower joint is preferably non-circularly configured for resisting rotations of the sleeve's lower segment with respect to the medial segment. In a preferred embodiment, such non-circular configuration forms a lower or second pin-and-socket joint wherein the joint's pin half comprises travel slots which open radially outwardly at the upper end of the medial segment, and wherein the joint's socket half comprises the downwardly opening concavity of the hollow bore of the medial segment, such commonly presenting inwardly extending lugs or protuberances which are positioned for rotation stopping engagements with such travel slots.

A further structural component of the instant inventive tool comprises a first gear or drive gear which is fixedly attached to the upper end of the sleeve's upper segment, such gear preferably having a vertical rotation axis which substantially coincides with a vertical rotation axis of the sleeve's upper segment. In a preferred embodiment, the first gear is peripherally toothed for engagement with a powered pinion gear or second gear, such gear being described below.

A further structural component of the instant inventive tool comprises a support frame which is fixedly and rigidly attached to the sleeve's medial segment, preferably at such segment's upper end. In the preferred embodiment, the support frame is formed and configured as a gear train supporting and enclosing housing.

A further structural component of the instant inventive tool comprises the second gear or pinion gear, such gear being rotatably mounted upon the frame for, upon powered rotation of the second gear, engagement with and rotation of the first gear.

A further structural component of the instant inventive tool comprises a rotary power input shaft or stem. In the preferred embodiment, such stem is adapted for secure attachment to the rotary drive chuck of an electric drill or socket driver. In the preferred embodiment, a lower end of such stem is fixedly mounted axially to the second gear or pinion gear, such stem protruding upwardly and outwardly from the frame or housing component.

Further structural components of the instant inventive tool comprise means for holding the apertured member immediately beneath the screw's shaft biasing lower end. In a suitable embodiment, such means are configured to present an annular clamp which is adapted to nestingly receive an axle mounting shoulder or step of the type which is commonly present at the hub of an axle driven fan. Suitably, such means may alternatively comprise a circumferential array of pivoting hook arms which may radially pivot for engagements with peripheral edge of a gear to be pulled off of an axle. Similarly with the function of the above described annular clamp, such hook arms may effectively hold a gear in axial alignment immediately beneath the lower biasing end of the screw shaft.

In operation of the instant inventive tool, and assuming that the tool's provided means for holding an apertured member comprises an annular clamp, such clamp may be initially secured and attached to, for example, an annular axle shaft mounting shoulder of the type commonly present upon the hub of a scirocco fan. To achieve such attachment, the lower sleeve segment of the instant inventive tool may be easily and conveniently inserted into and clamped within the air intake port of such fan. Such holding means preferably presents a circumferential array of set screws which may be tightened for securely clamping against such axle mount shoulder. Upon tightening of the set screws, the lower segment of the tool is advantageously securely mounted upon the exemplary scirocco fan.

Thereafter, the chuck of an electric drill may be securely attached to the tool's rotary power input stem.

Thereafter, the medial segment may be slidably engaged with the lower segment while the upper segment simultaneously engages with the upper end of the screw.

Thereafter, the electric drill may be operated to turn the stem component in a counter clockwise direction. Such drill operation simultaneously rotates the second gear or pinion gear, automatically counter-rotating such gear in the clockwise direction. Such first gear rotation correspondingly rotates the upper segment of the multiply segmented sleeve, and simultaneously turns the screw shaft whose head is engaged pin-and-socket fashion with the upper segment.

Simultaneous rotation of the helical threads of the male screw shaft within the female helical threads of the hollow bore of the sleeve's lower segment downwardly drives the screw shaft, advantageously causing such shaft's biasing lower end to impinge against the exposed end of the axle shaft which is mounted within the fan's shoulder mount. Continued drill actuated operation of the tool progressively drives the screw shaft against such axle shaft, advantageously driving the axle shaft out of the shoulder mount.

Accordingly, objects of the instant invention include the provision of a tool which incorporates structures as described above, and which arranges those structures in relation to each other in manners described above, for the achievement of and performance of beneficial functions as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENTS

Figure 1:
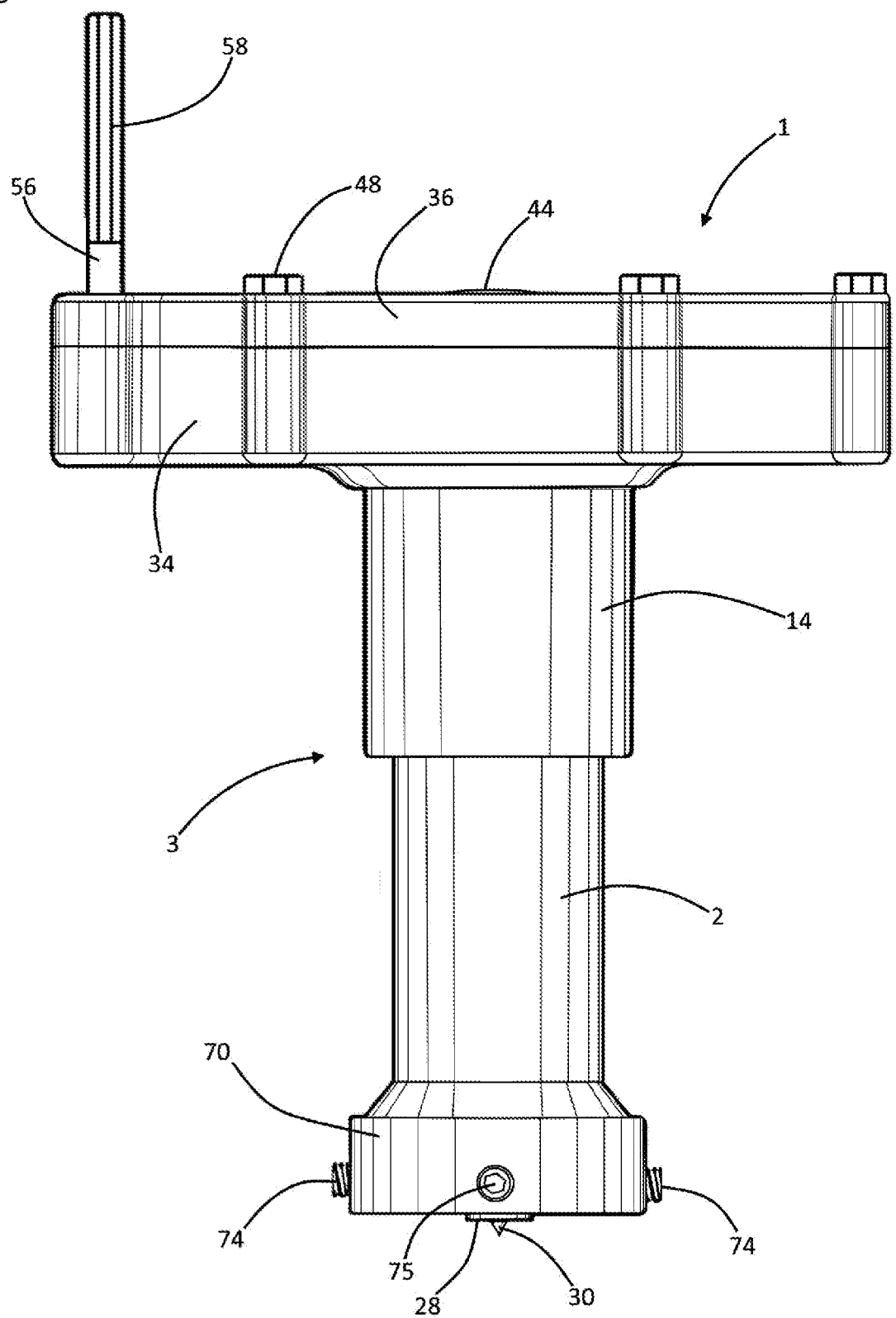
FIG. 1 presents a side view of the instant inventive tool.
Figure 2:
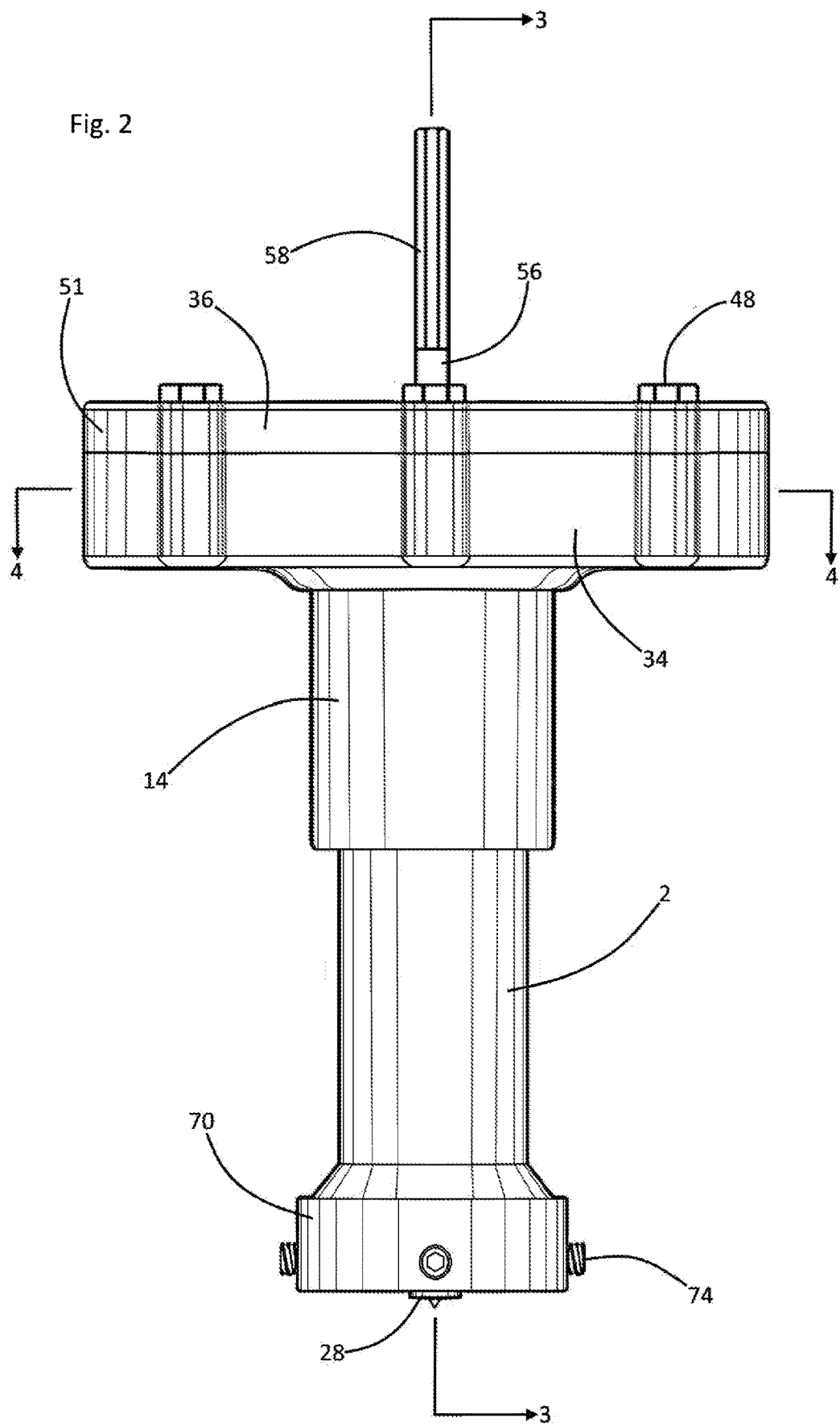
FIG. 2 redepicts the structure of FIG. 1, the view of FIG. 2 showing the tool rotated clockwise 90° about a vertical axis.

Referring now to the drawings and in particular to Drawing FIGS. 1-4, a preferred embodiment of the instant inventive tool for driving a shaft is referred to generally by Reference Arrow 1. The tool 1 comprises a multiply segmented sleeve which is referred to generally by Reference Arrow 3, such sleeve 3 comprising a lower segment 2, an upper segment 18, and a medial segment 14.

The sleeve's lower segment 2 preferably has a vertically extending hollow bore 4 having an upper opening 8. The wall of the lower end of such bore 4 preferably presents female helical threads 6. In the preferred embodiment, the upper end of the sleeve's lower segment 2 presents a pair of vertically extending travel slots 12 which open radially outwardly. Such slots 12 advantageously non-circularly configure the lower segment's upper end to function as a rotation resisting pin half of a first or lower pin-and-socket joint. The sleeve's medial segment 14 is preferably closely fitted for sliding upward receipt of the upper end of the lower segment 2, such medial sleeve segment preferably presenting radially inwardly protruding rotation stopping lugs 16 which extend into and engage with the travel slots 12.

The upper segment 18 of the sleeve 3 preferably has a hollow bore 7 which has a lower downward opening 20. The peripheral wall of such bore 7 is non-circularly configured, preferably presenting a series of faces or facets 19. In the preferred embodiment, the sleeve's upper segment 18 is adapted for rotation within and with respect to the medial segment 14, such adaptation suitably comprising a lower rotary bearing 38. As an alternative to the depicted nesting receipt of sleeve upper segment 18 within sleeve medial segment 14, such upper segment may be secured to overlie the upper opening of the medial segment.

A vertical rotation shaft 22 having a male threaded lower end 24 is helically threadedly received within the female helical threads 6 of the hollow bore 4 of the lower sleeve segment 2. Suitably, and alternatively, the complete vertical lengths of hollow bore 4 and shaft 22 may be helically threaded. The lower end 28 of the screw shaft 22 preferably includes an axial frictional pin or point 30 for secure centering engagement with an end of an axle shaft. The upper end of the screw shaft 22 preferably includes an enlarged and non-circularly faceted head 26, such head advantageously functioning as a non-circular and rotation stopping pin half of the tool's upper pin-and-socket joint.

A first gear or drive gear 32 is preferably fixedly and axially mounted to the upper end of the sleeve's upper segment 18, such attachment mechanically requiring that rotation of gear 32 simultaneously rotates both sleeve segment 18 and the screw head 26 which is captured within such segment's downwardly opening void or socket 7.

A rigid frame 34 is preferably provided, such frame rotatably supporting a pinion gear or second gear 50. In the preferred embodiment, such rigid frame 34 comprises a lower clamshell half of an enclosed gear housing, the upper half of such housing and support frame member comprising a lid or cover 36. Fastening screws 48 securely interconnect the upper and lower halves 36 and 34 of the tool's housing frame member to define an interior gear train encasing space 46.

To bolster the rotatable support of the first gear 32 which is provided by lower bearing 38, an upwardly extending journal axle 44 is provided, such axle being further rotatably supported by an upper bearing 40 which is situated about an axle aperture 42 which centrally opens the upper housing 36.

Similarly with the rotary support of the upper sleeve segment 18 and of the first gear 32 which is provided by bearings 38 and 40, bearings 52 and 62 provide rotatable support to the second gear or pinion gear 50. A lower journal axle 54 extends downwardly from pinion gear 50 for rotating engagement with a lower bearing 52, and an upper stem axle 56 extends axially upwardly therefrom from gear 50 through housing aperture 60, such upwardly extending stem axle 56 being further rotatably supported by an upper bearing 62. In a preferred embodiment, the upper end of stem 58 is hexagonally configured for engagement with the chuck of a drill or socket driver (not depicted within views).

The housing frame 34,36 preferably includes a radially outward extension 51 which expands the interior space 46 to accommodate the operative radially outer positioning of the second gear 50.

Further components of the instant inventive tool comprise means for holding the apertured member immediately beneath the lower end of the tool 1. In a suitable embodiment, such means comprise an annularly extending clamping ring 70 which presents an annular or circumferential array of set screws 74, such screws having allen wrench engaging socket 75. In the alternative configuration of FIG. 5, all structures identified by a reference numeral having the suffix "A" are configured similarly with similarly numbered structures appearing in FIGS. 1-4. In the FIG. 5 alternative, the apertured member holding means comprise a circumferential array of hook arms 80 and 88 whose proximal ends are pivotally mounted to the sleeve's lower segment 2A by pivot mounts 84,86 and 92,94.

Figure 5:
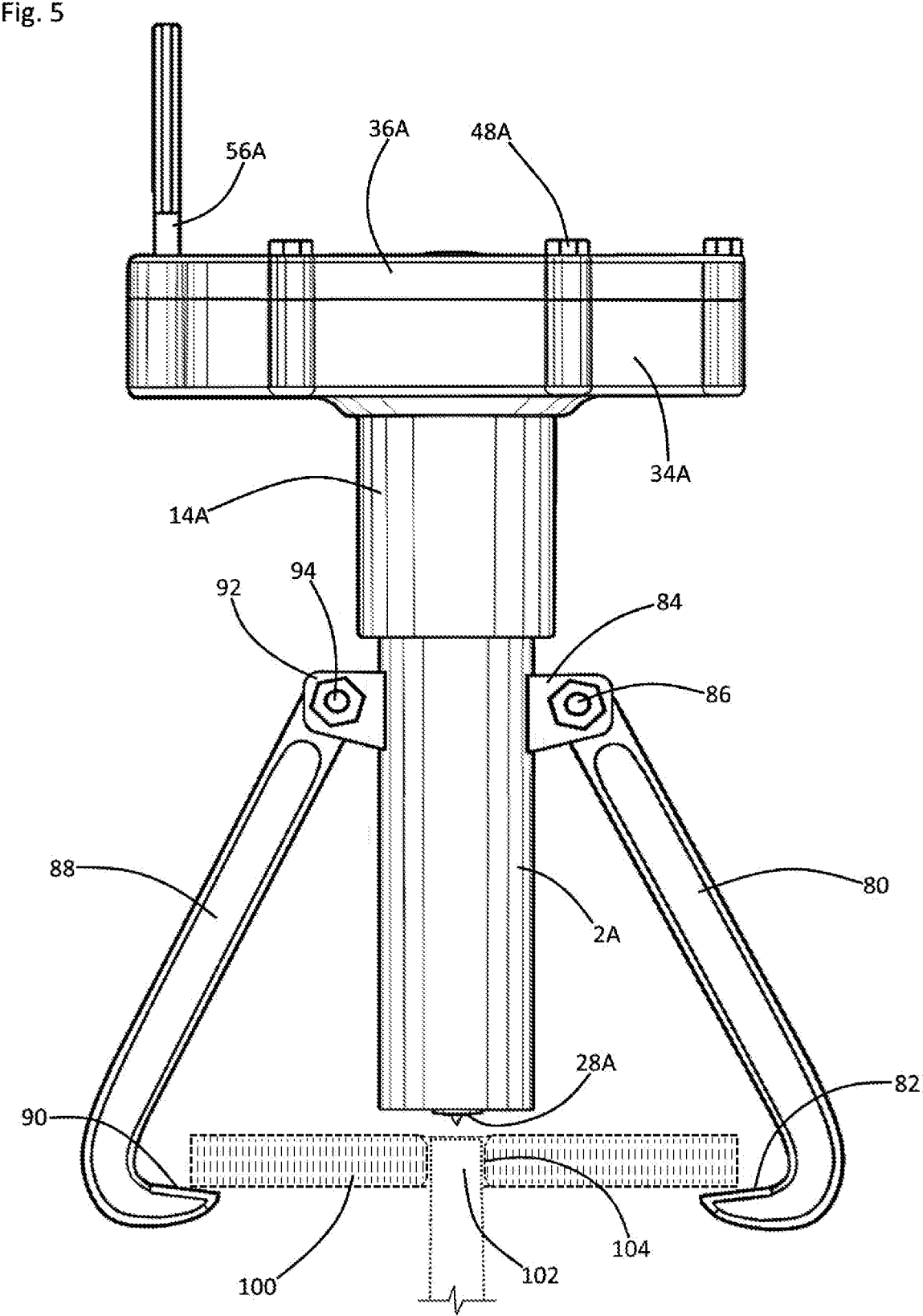
FIG. 5 redepicts the structure of FIG. 1, the view of FIG. 5 showing alternative mechanical means for holding a shaft bearing apertured member.

In operation of the FIG. 5 exemplary tool (and referring simultaneously to all figures), hooked distal ends 82 and 90 of hook arms 80 and 88 may be positioned to engage the peripheral edge of a gear 100, as indicated. Thereafter, the sleeve's medial segment 14A may be slidably placed over the upper end of the lower segment 2, such sliding attachment simultaneously engaging the head of the tool's screw 22 within the faceted bore of upper segment 18. Thereafter, an electric drill may be attached to stem 56A. Operation of the drill simultaneously rotates and counter rotates the stem 56A, the pinion gear 50, the main drive gear 32, the upper sleeve segment 18, and the screw 22, such rotations being with respect to frame housing 34,36, medial sleeve segment 14, lower sleeve segment 2, and holding means 80,82,84, 86,88,90,92,94, which are relatively rotationally fixed. Such relative rotations advantageously downwardly drive the screw's biasing end 28A against axle 102, driving said axle downwardly out of axle aperture 104 within gear 100.

Figure 3:
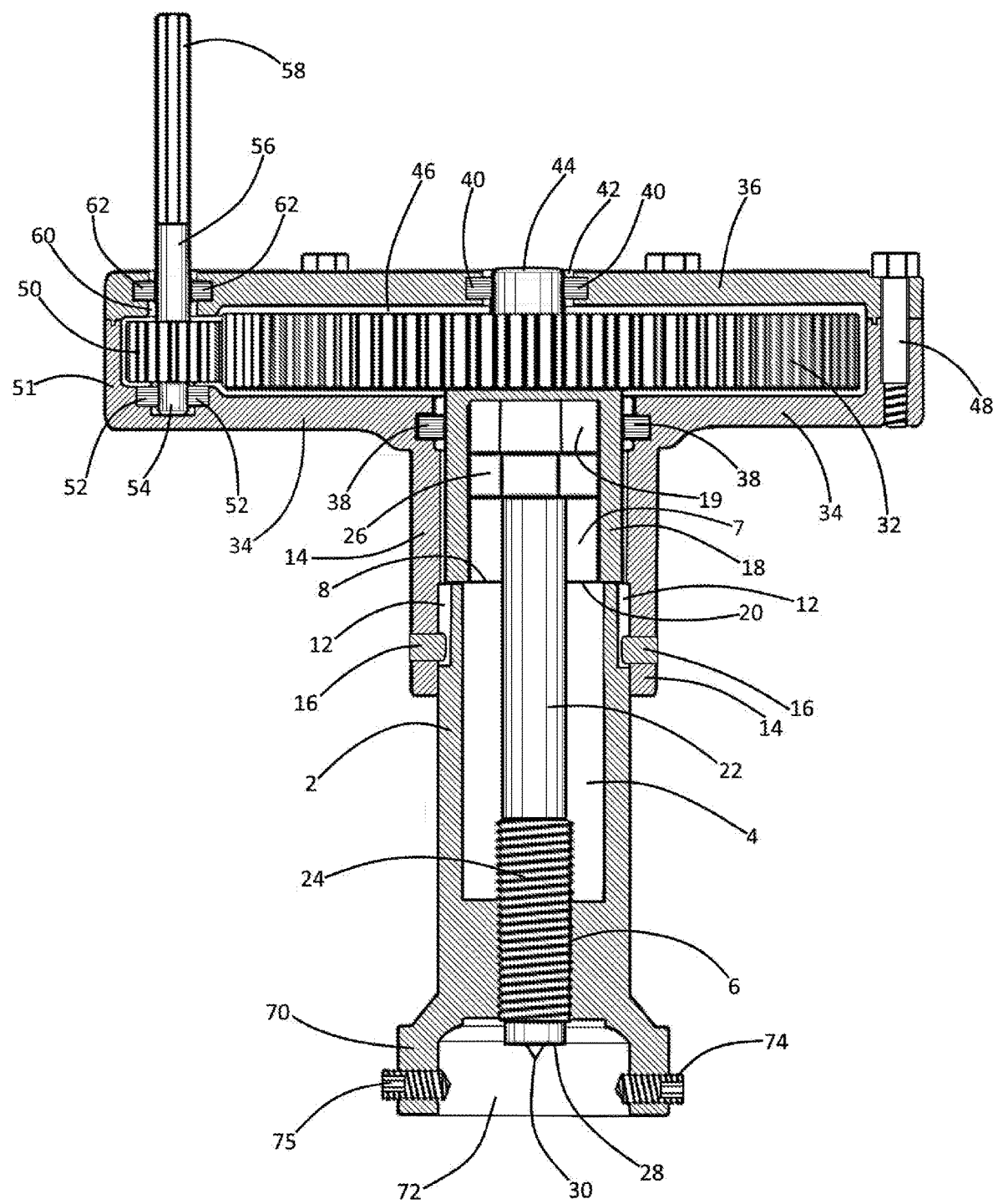
FIG. 3 is a sectional view, as indicated in FIG. 2.
Figure 4:
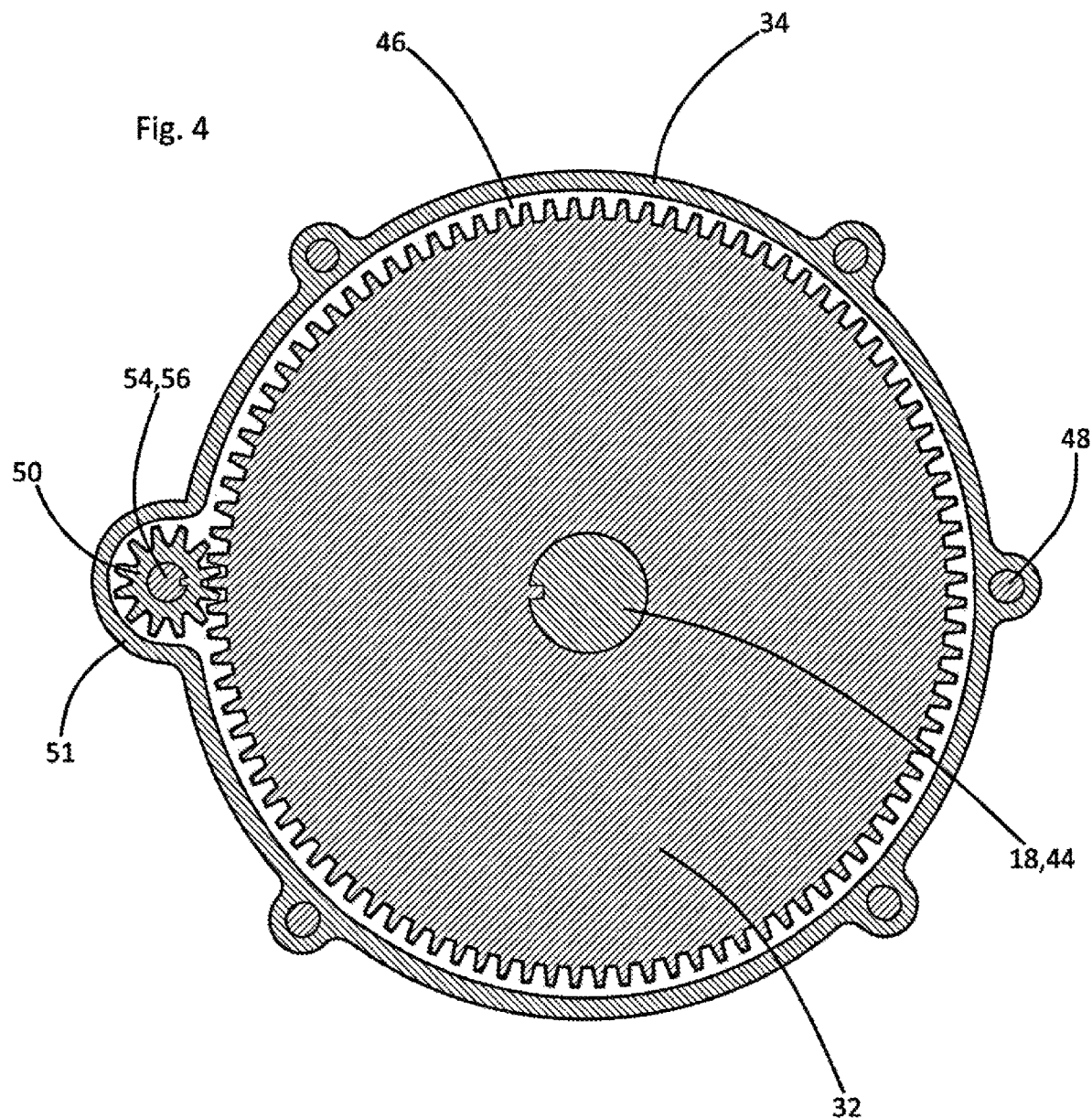
FIG. 4 is an alternative sectional view, as indicated in FIG. 2.

A smaller disc shaped axle containing member configured similarly with gear 100 may be upwardly inserted into concavity 72 of the FIG. 3 holding means alternative. Upon such insertion, the set screws 74 may perform substantially the same function as hooks 82 and 90.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A tool for driving a shaft, the shaft being received within an apertured member, the tool comprising:
   (a) a segmented sleeve comprising an upper segment, a lower segment, and a medial segment, each such segment having an upper end, a lower end, and a hollow bore, the hollow bore of the lower segment being helically threaded;
   (b) a screw mounted within the lower segment's hollow bore, the screw having an upper end and a shaft biasing lower end;
   (c) upper and lower joints, the upper joint connecting the upper end of the screw with the upper segment, and the lower joint connecting the medial segment with the lower segment;
   (d) a first gear fixedly attached to the upper segment, wherein the first gear and the upper segment are adapted for co-rotation within a gear housing and within the medial segment's hollow bore;
   (e) the gear housing fixedly attached to the medial segment;
   (f) a second gear mounted rotatably upon the gear housing, the second gear being positioned for, upon a rotation of the second gear, rotating the first gear;
   (g) a stem fixedly attached to the second gear; and
   (h) means for holding the apertured member, said means being adapted for positioning said member beneath the screw's shaft biasing lower end.

2. The tool of claim 1 wherein the upper joint comprises an upper non-circular pin-and-socket joint.

3. The tool of claim 2 wherein the lower joint comprises a lower non-circular pin-and-socket joint.

4. The tool of claim 3 wherein the means for holding the aperture member comprise an annular clamp or a circumferential array of hook arms.

5. The tool of claim 4 wherein the upper non-circular pin-and-socket joint's socket is adapted for facilitating linear travel of said joint's pin.

6. The tool of claim 5 wherein the lower non-circular pin-and-socket joint's socket is adapted for linear travel of such joint's pin.

* * * * *